United States Patent [19]

Brockley

[11] Patent Number: 4,589,104
[45] Date of Patent: May 13, 1986

[54] SPACER/PROTECTOR FOR STACKING RECORDED 33 RPM RECORDS

[76] Inventor: Richard C. Brockley, 657 Linden Ave., York, Pa. 17404

[21] Appl. No.: 689,779

[22] Filed: Jan. 8, 1985

[51] Int. Cl.⁴ ............................................. G11B 23/02
[52] U.S. Cl. ................................................... 369/291
[58] Field of Search ........................................ 369/291

[56] References Cited

U.S. PATENT DOCUMENTS

| | | | |
|---|---|---|---|
| 1,683,440 | 9/1928 | Bodwell et al. | 369/291 |
| 2,225,048 | 12/1940 | Hasin | 369/291 |
| 2,906,536 | 9/1959 | Mauerhoff | 369/291 |
| 3,360,271 | 12/1967 | George | 369/291 |
| 3,540,736 | 11/1970 | Pallie | 369/291 |
| 3,854,729 | 12/1974 | Downs | 369/291 |
| 4,021,048 | 5/1977 | Fowler et al. | 369/289 |
| 4,061,341 | 12/1977 | Kaplan | 369/291 |
| 4,123,063 | 10/1978 | Van Winkle | 369/289 |
| 4,204,686 | 5/1980 | Church | 369/291 |
| 4,316,281 | 2/1982 | Prusak | 369/291 |

FOREIGN PATENT DOCUMENTS 469666 12/1928 Fed. Rep. of Germany ...... 369/291

*Primary Examiner*—Steven L. Stephan

[57] ABSTRACT

A spacing means insertible between adjacent phonograph records as in a stack of two or more and between a single record and a turntable, and comprising a thin, disc-like member, preferably of light weight and including a peripheral spacing and seat arrangement to receive a phonograph record and space the periphery thereof from a turntable or an adjacent record, and the central portion of the disc-like member having axially projecting areas on opposite surfaces of the disc-like member operable to effect spacing of a phonograph record either from a turntable, or another record as in a stack thereof.

4 Claims, 4 Drawing Figures

SPACER/PROTECTOR FOR STACKING RECORDED 33 RPM RECORDS

REFERENCES CITED U.S. PATENT DOCUMENTS

U.S. Pat. No. 1,683,440 9/1928, Bodwell et al.
U.S. Pat. No. 1,683,469, 9/1928, Kauffman
U.S. Pat. No. 1,908,940, 5/1933, Weidel
U.S. Pat. No. 2,906,536, 9/1959, Mauerhoff
U.S. Pat. No. 3,051,496, 8/1962, Borgia
U.S. Pat. No. 3,169,023, 2/1965, Rivas
U.S. Pat. No. 3,360,271, 12/1967, George
U.S. Pat. No. 3,540,736, 11/1970, Pallie
U.S. Pat. No. 3,670,878, 6/1972, Seiger
U.S. Pat. No. 3,854,729, 12/1974, Downs
U.S. Pat. No. 4,021,048, 5/1977, Flower et al.
U.S. Pat. No. 4,061,341, 12/1977, Kaplan
U.S. Pat. No. 4,204,686, 05/1980, Church
U.S. Pat. No. 4,316,281, 2/1982, Prusak

BACKGROUND OF THE INVENTION

This invention is congruent with the necessity to have a device that is used under one recorded 33 RPM record, or below and between two or more of such records, as in a stack, to help prevent any dust, dirt, and/or other contaminating debris from becoming abraded into the recorded surface through various use on a phonograph turntable, or rasping between adjacent discs.

Recorded 33 RPM records consist of one basic, standard construction in both general weight and size. The composition of such records includes a flat, rigid plate, with the diameter standard at 11⅞", that is a plastic material, with a center hole, having a diameter standard of 9/32". Small, delicate, spiralled grooves that comprise the recorded medium are pressed into the plastic plate's radial, central region, generally ¼" from the peripheral edge, and extending inward approximately 3", and then tapering off to blank, unrecorded medium of about ½" to ¾" depth, enveloping the central, labeled area, (having a diameter standard of 4"). Because of the intricate delicacy of these grooves that formulate the recorded medium to produce sound, (when operated on a phonograph unit), scratches, abrasions, and the accumulation of various contaminating particles can result in severe disruption of the sound quality of said 33 RPM records.

Other than in cases of abuse..scratches, abrasions, and contaminents are the direct result of frictional contact between the recorded 33 RPM records w/that of the phonograph turntable and/or adjacent records, as in a stack. Damage is basically a periodical occurence that happens when the records, during use, are continually subjected to such frictional abrading with surrounding medium. Also, during this contact, the force of gravity, creating opposing weight, from the embodying medium, aforesaid, can cause various foreign particles to become impacted and rasped within the groove regions, thus, adversley creating a loss in the recorded sound quality.

SUMMARY OF THE INVENTION

This idea developed from the necessity to create a practical, convenient and functional spacing/protecting device for recorded 33 RPM records that would present a safe, durable, marketable item, that is convenient, attractive and easy to use, and compatible for use on most phonographs with or without an automatic loading system.

The invention, in question, demonstrates such a device for use under one recorded 33 RPM record, (with the standard diameter 11⅞"), or below and between two or more of such records, as in a stack, to prevent damage or quality loss that can evolve when singular or stacked records are subjected to various periods of use, unprotected from dust, dirt and/or other contaminating debris. This device will eliminate frictional impact with phonograph turntables, or adjacent multiple records to that of the recorded areas of those 33 RPM records, during automatic or manual loading and the aforesaid periods of use. The invention will eradicate destructive particles from being pressed or abraded into the delicate grooves that comprise the recorded medium, and shield those recorded areas from damaging one another through frictional rasping, as when one rests or falls upon another, as in a stack. Also, the device in question will assist the user in minimizing hand/finger contact with the recorded 33 RPM records, lessening bodily contamination of such records.

DETAILED DESCRIPTION OF A PREFERRED EMBODIMENT

Figure 1:
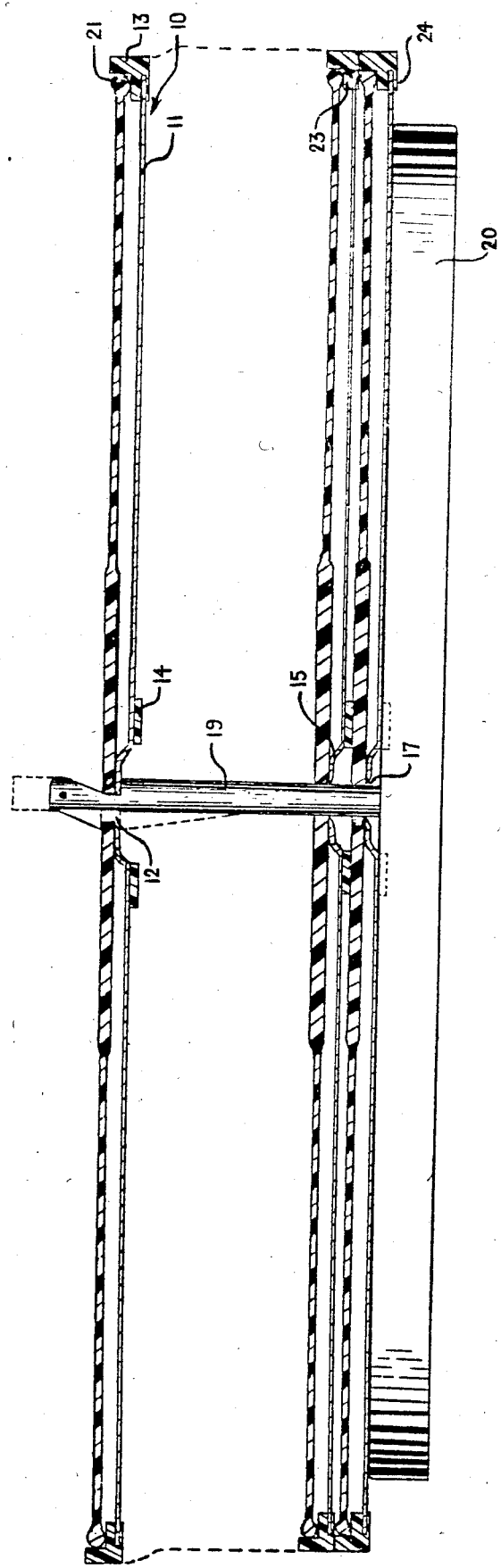
FIG. 1 is a side view, (partially in section), of a stack, alternating, recorded 33 RPM records, and the present invention, (which is a spacer plate, separating the recorded 33 RPM records from the phonograph turntable, and the adjacent records).
Figure 2:
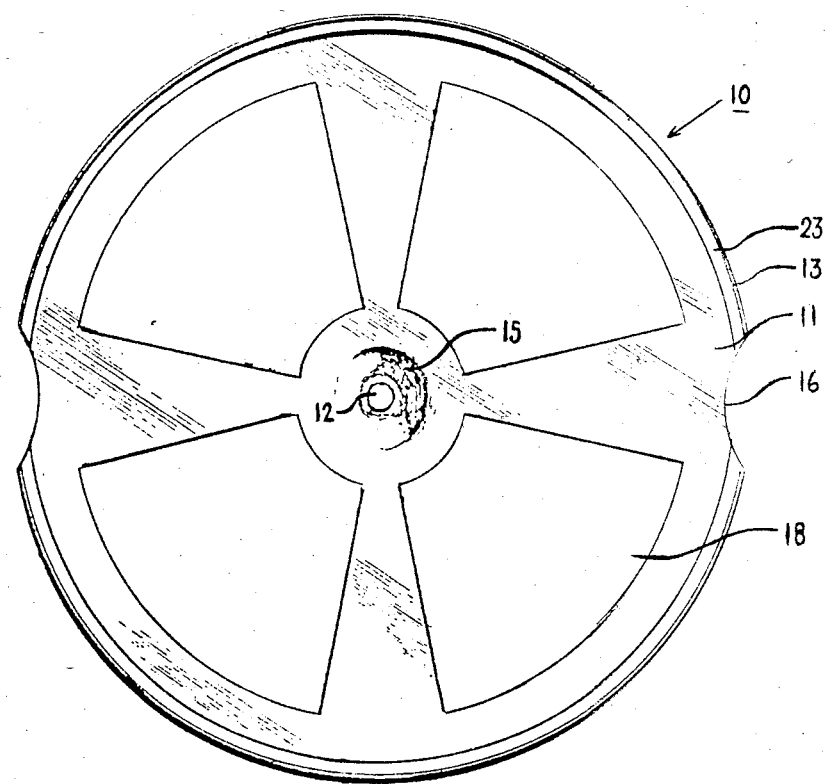
FIG. 2 is a top, plane view demonstrating an overall concept of the present invention.

Referring to all FIGS., a preferred embodiment of the presented invention will be designated as 10. The spacer/protector device 10 is a light, rigid, extremely thin plate 11, with a center hole 12, embodied by an elevated, portional contour 15, molded directly in the plate, (which is the plate material itself). The material of the plate 11 is either aluminum or acrylic plastic, with a diameter of 11⅞". The thickness of the plate 11 will vary, depending on the material being used. The center hole 12 has a diameter of 9/32" and the embodying central, elevated contour 15 can vary in diameter from 1" to 1½" with a raised, optimum level of 3/32" which is a level that must always be uniform with the top, innermost, pheripheral support 23, so that a recorded 33 RPM record 21, in use, will always lie on an even plane when in the device 10. The outermost, peripheral end 13 is elevated 3/32" above the top, innermost, peripheral support 23. This 3/32" level of the outermost, peripheral end 13 constitutes the protection means of the recorded 33 RPM record 21 in place, from an adjacent, above device 10 during auto or manual loading, as in a stack. It is intended for the top, innermost peripheral support 23, the outermost, peripheral end 13, and the bottom, peripheral tangent 24 to be constructed, all, as one piece, preferrably of hard, durable rubber, capable of withstanding impact of auto loading, as in a stack, with adjacent devices 10; the material should be such that is non-damaging to the outer periphery of the recorded 33 RPM records 21, in use, and that will grip to its like surface, when stacked, so as to prevent slippage with other adjacent devices 10. (Also, the records 21 in use should grip to the material so as to prevent slippage). This part, (that constitutes Nos. 13, 23 and 24), will be bonded to the plate 11 with a suitable adhesive. The bottom, peripheral tangent 24 should be a thickness of approximately 1/16 " and serves to aid in desisting slippages, softening impact during stacked loading with other devices 10, and providing additional spacing with the below device 10 from that to the recorded 33 RPM record 21. Bottom, inner, stabilizing supports 14, with a thickness of 1/16 " that is uniform to the bottom, peripheral tangent 24, comprise the medium necessary to support the central region of the device 10 from being semi-collapsing at the center, when stacked, and will each be bonded to the plate with a suitable adhesive. Cut out finger tabs 16 will be implemeneted to allow easy removal access of recorded 33 RPM records 21 in place. Weight reducing cut outs 18 may be extremely necessary and vary in size depending on the thickness and type of material being used to form the plate 11, because the weight of the device 10 must be as little as possible to lessen the impact of auto loading of the device 10 and recorded 33 RPM records 21, in use, with that of the phonograph turntable 20 (see FIG. 1), and the mechanisms below the turntable so as to prevent damage to the phonograph unit.

Figure 3:
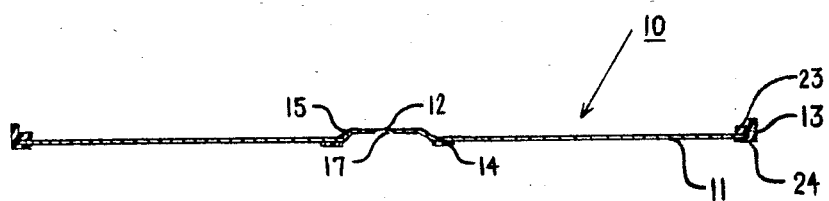
FIG. 3 is a sectional view of the present invention only, (as several were demonstrated in illustration in FIG. 1)
Figure 4:
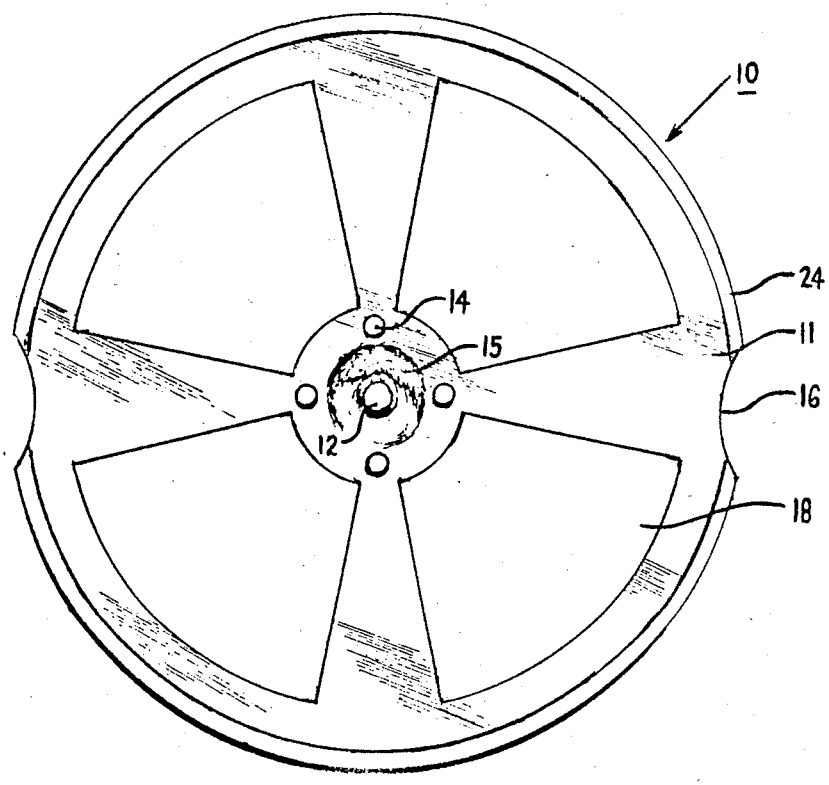
FIG. 4 is a bottom, plane view demonstrating the overall concept of the present invention.

Referring to FIGS. 1 and 3, a countersunk concave 17 below and surrounding the center hole 12 will be implemented to insure that the device 10 and the recorded 33 RPM record 21, in place, auto load as a unit, down the turntable, loading mandrel 19 simultaneously, so as not to fail or disrupt the auto loading process.

Referring specifically to FIG. 1, there is demonstrated several spacer/protector devices 10, of the invention presented, below and between adjacent recorded 33 RPM records 21 as to be stacked on an auto loading phonograph system. Each record 21 has a labeled, unrecorded region in the center (radiating 2"), that partially rests upon the central, elevated contour 15 of the device 10. On the outer periphery of the record 21 is also a unrecorded region that rests upon the top, innermost, peripheral support 23, (on an even plane with the central elevated contour 15 of the device 10), and the record 21 is encompassed and over accentuated by the outermost peripheral end 13 which serves as the chief spacing and protecting means, of the record 21 in use, to that of the above adjacent device 10. The device 10 has a botttom, peripheral tangent 24 that makes contact with, and only with, the outermost peripheral end 13 of the underlying adjacent device 10, when loading, as in a stack. Finally, bottom, inner, stabilizing supports 14, (somewhat oversized in the FIG.), should be uniform in the thickness with that of the bottom, peripheral tangent 24 and comprises the necessary means to support the central region of the device 10 from semi-collapsing at its center, when stacked with other devices 10, (as shown). Thus, when the spacing/protecting device 10 is used in this way, any dust, dirt, or other contaminating particles which may lie on either the plate 11 or other adjacent recorded 33 RPM records 21 will not be pressed, abraded or rasped into the recorded areas of those recorded 33 RPM records 21 in use and will therefore prevent quality losses and damage that may have otherwise occurred.

I thus claim:

1. Spacing means insertible between adjacent phonograph records when in stacked relationship, said means comprising a disc-like member having a peripheral seat and spacing means around the circumference thereof, said member also having a central opening for reception of a phonograph spindle, the central portion of said member having an integral, axially displaced section formed by deforming the material of the member, said section being of limited area, projecting from one surface of said member, and adapted to receive and support the central non-recorded area of a phonograph record and prevent the record from making contact with a stacked adjacent record, turntable or underlying device and the opposite surface of said central portion of said member having a supplementary central spacing element affixed thereto for engaging the central portion of a lower record in a stack thereof or a turntable to effectively space the central portions of a plurality of stacked records.

2. The spacing means according to claim 1 further characterized by said peripheral seat and spacing means comprising a peripheral flange parallel to said member extending inward from the outer edge thereof a limited distance and from the periphery of said member and including a narrow spacing wall extending perpendicularly from said flange a distance greater than the tickness of the outer periphery of a phonograph record to be supported in said seat and spacing member whereby said wall engages the periphery of a superimposed additional spacing member when in a stack of records and spacing members.

3. The spacing means according to claim 2 further characterized by said peripheral seat and spacing means being a pair of similar arcuate members of limited width and respectively secured to the periphery of said member with the ends of said arcuate members being spaced similar limited distances and the portions of said disc-like member which coincides with said spaced ends of said arcuate members being notched to permit ready removal of a phonograph record from said peripheral seat of said spacing means.

4. The spacing means according to claim 1 further characterized by said supplementary central spacing element comprising a plurality of similar circumferentially spaced elements securely attached to said opposite surface of said member.

* * * * *